(12) United States Patent
Tanaka et al.

(10) Patent No.: US 11,648,782 B2
(45) Date of Patent: May 16, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Wakako Tanaka, Tokyo (JP); Minako Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/390,030

(22) Filed: Jul. 30, 2021

(65) Prior Publication Data

US 2022/0032648 A1 Feb. 3, 2022

(30) Foreign Application Priority Data

Aug. 3, 2020 (JP) .............................. JP2020-131644

(51) Int. Cl.
*B41J 2/21* (2006.01)
*G06K 15/02* (2006.01)
*G06K 15/10* (2006.01)

(52) U.S. Cl.
CPC .......... *B41J 2/2146* (2013.01); *G06K 15/102* (2013.01); *G06K 15/1878* (2013.01)

(58) Field of Classification Search
CPC .. B41J 2/2146; G06K 15/102; G06K 15/1878
USPC ......................................... 358/1.1, 1.9, 1.15
See application file for complete search history.

(56) References Cited

U.S. PATENT DOCUMENTS

| | | | |
|---|---|---|---|
| 6,025,929 A | 2/2000 | Nakajima | |
| 6,738,160 B1 | 5/2004 | Utzui | |
| 9,064,202 B2 | 6/2015 | Tanaka | |
| 9,623,670 B2 | 4/2017 | Kagawa | |
| 9,649,839 B2 | 5/2017 | Ishikawa | |
| 9,661,181 B2 | 5/2017 | Kato | |
| 9,704,074 B2 | 7/2017 | Kato | |
| 9,715,636 B2 | 7/2017 | Ikeda | |
| 9,944,102 B2 | 4/2018 | Suwa | |
| 9,965,842 B2 | 5/2018 | Suwa | |
| 10,013,626 B2 | 7/2018 | Hori | |
| 10,089,732 B2 | 10/2018 | Ishikawa | |
| 10,430,684 B2 | 10/2019 | Tanaka | |
| 10,546,191 B2 | 1/2020 | Tanaka | |
| 2020/0156386 A1* | 5/2020 | Otani | ............ B41J 2/2146 |

FOREIGN PATENT DOCUMENTS

JP H10-13674 A 1/1998

* cited by examiner

*Primary Examiner* — Quang N Vo
(74) *Attorney, Agent, or Firm* — Venable LLP

(57) ABSTRACT

A technique capable of suppressing a color shift caused by a variation in ejection characteristics among nozzles is to be provided. A generating unit configured to generate print data which is configured with a printing pixel, which represents that a printing agent is applied, or a non-printing pixel, which represents that a printing agent is not applied, generates the print data as follows: (i) the first quantization data is obtained by quantizing the first image data; and (ii) by applying a correction value based on the ejection characteristics related to a plurality of printing elements for applying a printing agent, a value representing that a printing agent is applied a plurality of times is set for at least one target printing pixel in the first quantization data.

15 Claims, 17 Drawing Sheets

FIG.8A

| 140 | 140 | 140 |
|-----|-----|-----|
| 140 | 140 | 140 |
| 140 | 140 | 140 |

FIG.8B

| 143 | 143 | 143 |
|-----|-----|-----|
| 143 | 143 | 143 |
| 143 | 143 | 143 |

FIG.8C

| 3 | 3 | 3 |
|---|---|---|
| 3 | 3 | 3 |
| 3 | 3 | 3 |

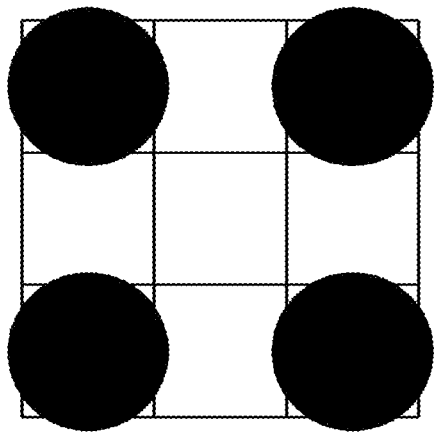
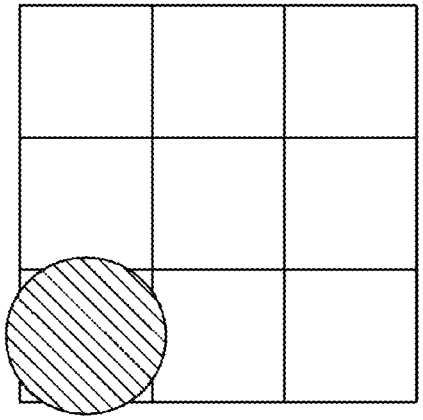

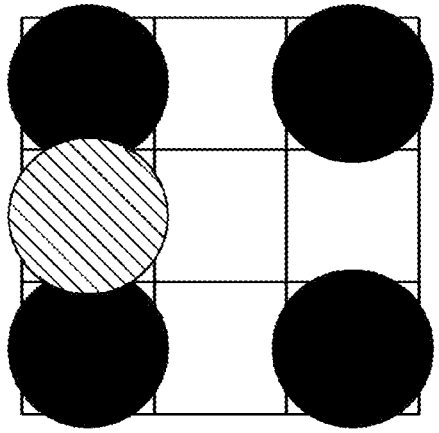
FIG.16C
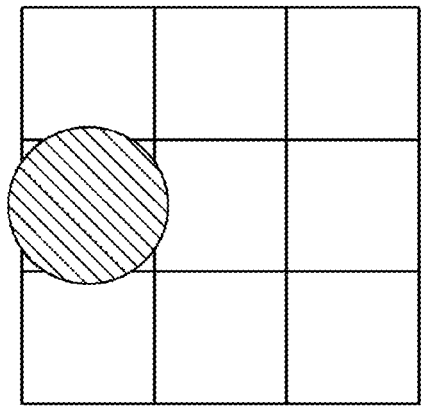
FIG.16B
FIG.16A
| Lv0 | Lv0 | Lv0 |
|---|---|---|
| Lv1 | Lv0 | Lv0 |
| Lv0 | Lv0 | Lv0 |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium for generating print data for printing an image on a relatively-moving print medium by use of multiple nozzles.

Description of the Related Art

In a printing apparatus that ejects ink onto a print medium by an inkjet system for printing, as for a print head including multiple nozzles that ejects ink, the ejection characteristics may vary among the nozzles due to manufacturing errors, etc. Note that the ejection characteristics include, for example, an ejection amount, an ejection direction, etc. If such ejection characteristics vary, irregular colors are likely to occur in the printed image.

Conventionally, for reducing irregular colors that occur in a printed image, usage of a head shading technique as disclosed in Japanese Patent Laid-Open No. H10-13674 is known, for example. The head shading technique is a technique for performing correction according to information related to the ejection characteristics of each nozzle and is a technique for controlling a driving pulse and correcting image data for each nozzle. Specifically, in a case of correcting image data, the number of ink dots to be finally printed is increased or decreased for each nozzle, so that it is possible to make the colors in the printed image almost uniform between nozzles.

However, even if such a head shading technique is used, there have been a possibility that a color shift occurs in a case of reproducing a multi-ordinal color (mixed color) in which two or more kinds of ink of different colors are overlapped and mixed. Specifically, there have been a possibility that the color development of the area printed by nozzles whose ejection amount is not standard is different from the color development of the area printed by nozzles whose ejection amount is standard. Note that the difference in the color shift of each area is visually recognized as an irregular color.

SUMMARY OF THE INVENTION

The present invention has been made in view of the above-described problems and provides a technique capable of suppressing a color shift caused by a variation in ejection characteristics among nozzles.

In the first aspect of the present invention, there is provided an image processing apparatus including:

an obtaining unit configured to obtain ejection characteristics related to a plurality of printing elements for applying a printing agent; and a generating unit configured to generate print data which is configured with a printing pixel, which represents that a printing agent is applied, or a non-printing pixel, which represents that a printing agent is not applied, based on first image data and the ejection characteristics, wherein the generating unit generates the print data as follows:

(i) first quantization data is obtained by quantizing the first image data; and (ii) by applying a correction value based on the ejection characteristics, a value representing that a printing agent is applied a plurality of times is set for at least one target printing pixel in the first quantization data.

In the second aspect of the present invention, there is provided an image processing method including:

an obtaining step for obtaining ejection characteristics related to a plurality of printing elements for applying a printing agent; and a generating step for generating print data which is configured with a printing pixel, which represents that a printing agent is applied, or a non-printing pixel, which represents that a printing agent is not applied, based on first image data and the ejection characteristics, wherein, in the generating step, the print data is generated as follows:

(i) first quantization data is obtained by quantizing the first image data; and (ii) by applying a correction value based on the ejection characteristics, a value representing that a printing agent is applied a plurality of times is set for at least one target printing pixel in the first quantization data.

In the third aspect of the present invention, there is provided a non-transitory computer readable storage medium storing a program for causing a computer to function as an image processing apparatus, the image processing apparatus including:

an obtaining unit configured to obtain ejection characteristics related to a plurality of printing elements for applying a printing agent; and a generating unit configured to generate print data which is configured with a printing pixel, which represents that a printing agent is applied, or a non-printing pixel, which represents that a printing agent is not applied, based on first image data and the ejection characteristics, wherein the generating unit generates the print data as follows:

(i) first quantization data is obtained by quantizing the first image data; and (ii) by applying a correction value based on the ejection characteristics, a value representing that a printing agent is applied a plurality of times is set for at least one target printing pixel in the first quantization data.

According to the present invention, it is possible to suppress a color shift caused by a variation in ejection characteristics among nozzles.

Further features of the present invention will become apparent from the following description of exemplary embodiments with reference to the attached drawings.

BRIEF DESCRIPTION OF THE DRAWINGS

FIG. 8A to FIG. 8C are diagrams for explaining the HS processing performed on an input image;

FIG. 11A to FIG. 11F are diagrams for explaining an HS input image and an HS correction amount image;

FIG. 16A to FIG. 16C are diagrams for explaining the movement of pixel data.

DESCRIPTION OF THE EMBODIMENTS

Hereinafter, with reference to the accompanying drawings, a detailed explanation will be given of examples of an embodiment of an image processing apparatus, an image processing method, and a storage medium. Note that it is not intended that the following embodiments limit the present invention, and every combination of the characteristics explained in the present embodiments is not necessarily essential to the solution in the present invention. In addition, relative positions, shapes, etc., of the constituent elements described in the embodiments are merely examples and are not intended to limit the range of the present invention to the examples.

First Embodiment

Figure 1:
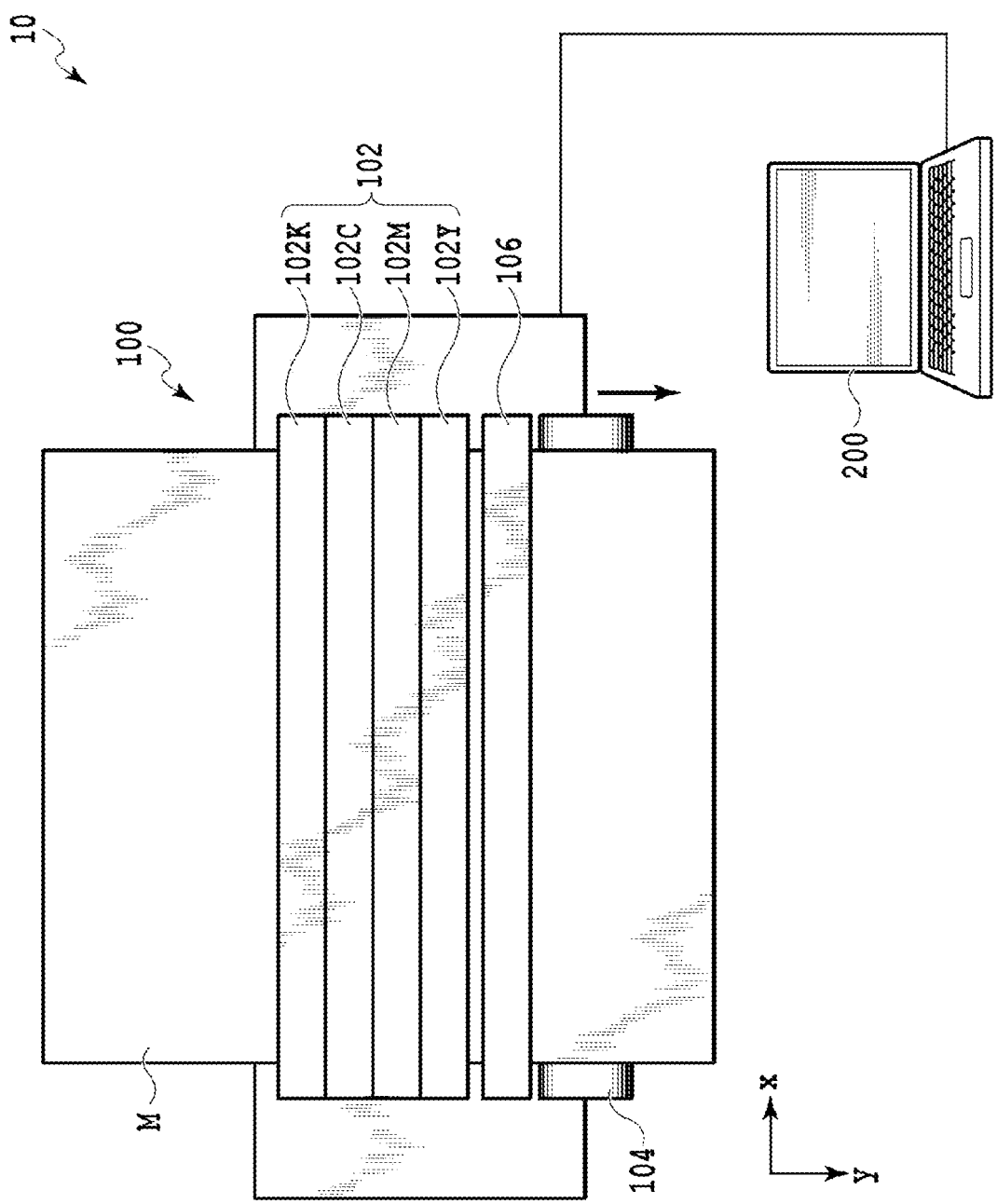
FIG. 1 is a schematic configuration diagram of a printing system including an image processing apparatus of an embodiment.
Figure 2:
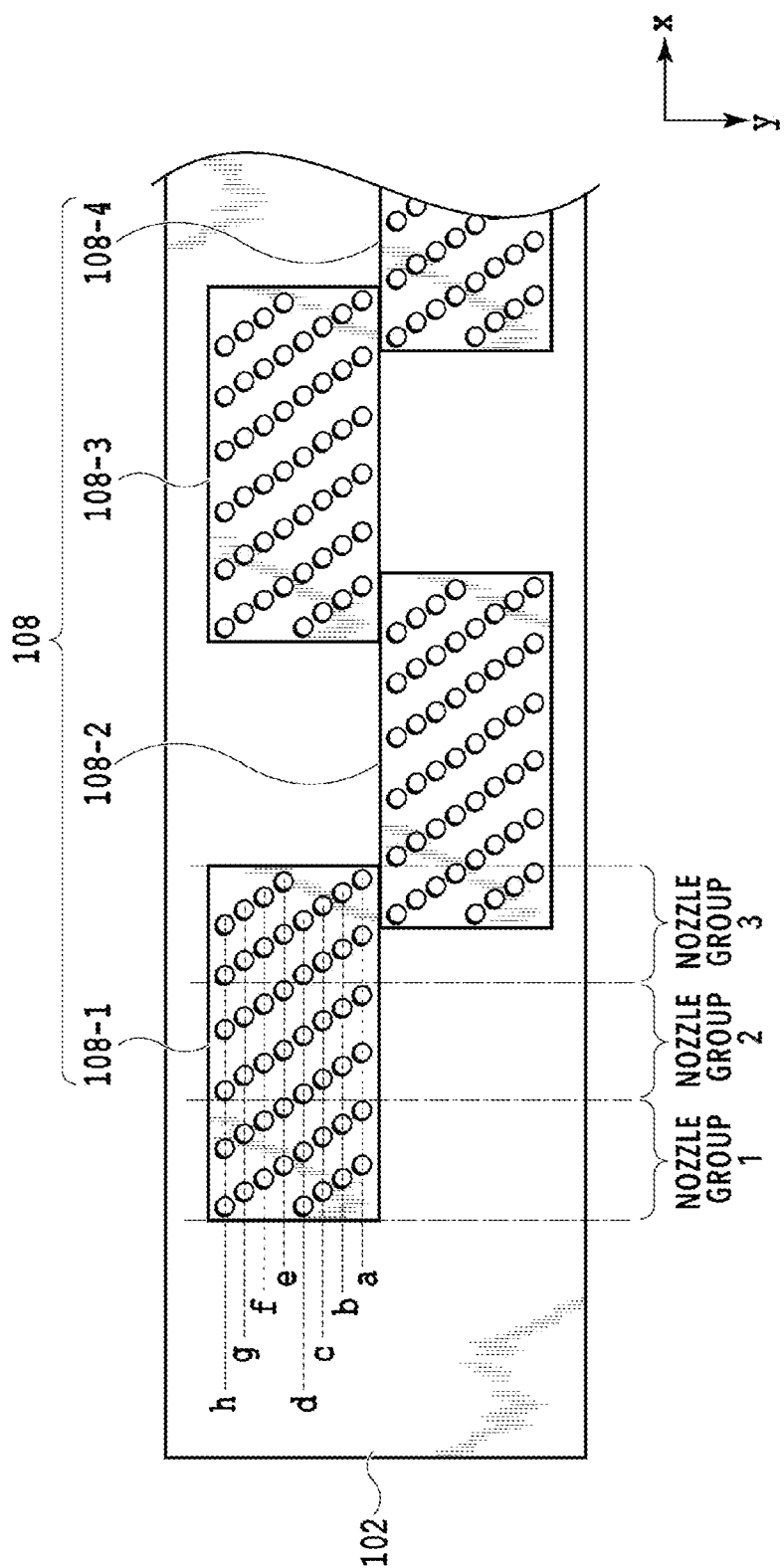
FIG. 2 is a diagram for explaining nozzle arrays of a print head.
Figure 3:
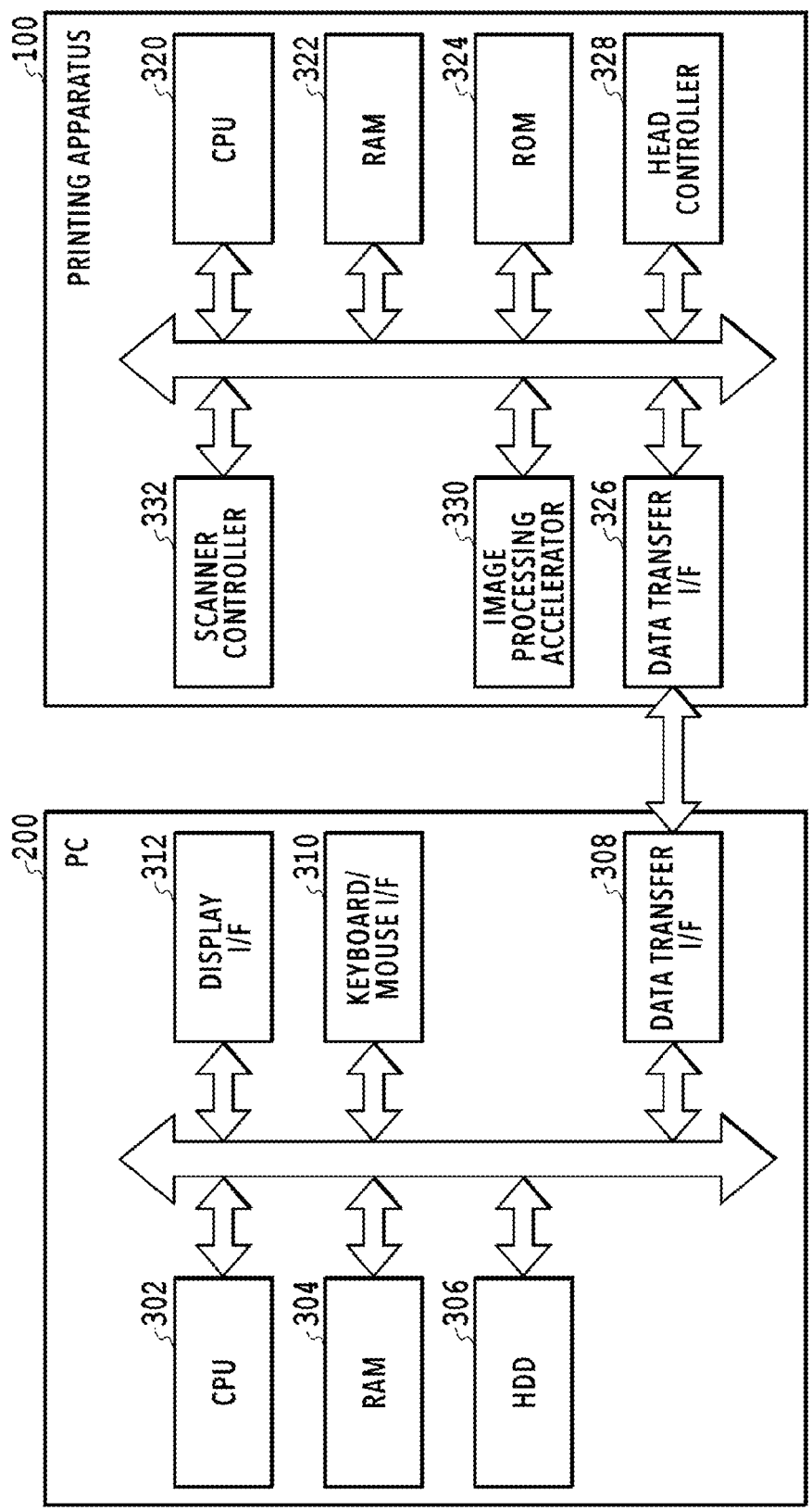
FIG. 3 is a block configuration diagram of the printing apparatus and a PC.

FIG. 1 is a schematic configuration diagram of a printing system including an image processing apparatus according to an embodiment. FIG. 2 is a diagram illustrating nozzle arrays of a print head. FIG. 3 is a block configuration diagram of a personal computer, which serves as a host apparatus, and a printing apparatus with which the printing system is configured.

The printing system 10 of FIG. 1 includes the printing apparatus 100, which ejects ink (also referred to as a printing agent) onto a print medium for printing, and the personal computer (PC) 200, which serves as a host apparatus of the printing apparatus 100.

The printing apparatus 100 is a full-line type inkjet printing apparatus. This printing apparatus 100 includes the print head 102, which ejects ink onto the print medium M for printing, the conveyance roller 104, which conveys the print medium M, and the scanner 106, which reads an image printed on the print medium M.

As for the print head 102, the four print heads 102K, 102C, 102M, and 102Y are arranged side by side in this order along the Y direction. The print head 102K ejects black ink, the print head 102C ejects cyan ink, the print head 102M ejects magenta ink, and the print head 102Y ejects yellow ink. The print head 102 extends in the X direction intersecting the Y direction (orthogonally in the present embodiment) and has a length that covers a print area in the width direction (X direction) of the print medium M conveyed in the Y direction.

The conveyance roller 104 is rotated by a driving force of a motor (not illustrated in the drawings) to convey the print medium M in the Y direction. Hereinafter, this direction in which the print medium M is conveyed in the Y direction is referred to as the conveyance direction of a print medium or simply as the conveyance direction. Note that the printing apparatus 100 is equipped with rollers driven by a motor in addition to the conveyance roller 104, and the print medium M is conveyed by these rollers and the conveyance roller 104. While the print medium M is conveyed by the conveyance roller 104, etc., the nozzles (which will be described later) of the print heads 102K, 102C, 102M, 102Y perform an ejection operation based on print data at a frequency corresponding to the conveyance speed of the print medium M. Accordingly, the ink dots of each color are printed at a predetermined resolution corresponding to the print data, so that an image is formed on the print medium M.

The scanner 106 is disposed on the downstream side relative to the print head 102 in the conveyance direction and has a length that covers a print area in the width direction (X direction) of the print medium M. In the scanner 106, reading elements (not illustrated in the drawings) are arranged at a predetermined pitch along the X direction on the surface facing the print medium M. The scanner 106 can read the image printed by the print head 102 for an output of RGB multi-valued data.

As illustrated in FIG. 2, each of the print heads 102K, 102C, 102M, and 102Y has a nozzle array, which is an array of multiple nozzles equipped with printing elements for ejecting ink and is formed on the surface facing the print medium M. This nozzle array is formed in an area corresponding to the width of the print area in the print medium M. More specifically, in each print head 102, multiple ejection boards 108 on which a nozzle array is formed are arranged so that ejection boards next to each other are adjoining in the Y direction and are shifted so as to partially overlap each other in the X direction.

Specifically, regarding the ejection board 108-1 and the ejection board 108-2 that are adjoining each other, the ejection board 108-2 is arranged on the downstream side in the conveyance direction relative to the ejection board 108-1 so as to partially overlap the ejection board 108-1 in the X direction. Further, regarding the ejection board 108-2 and the ejection board 108-3 that are adjoining each other, the ejection board 108-3 is arranged on the upstream side in the conveyance direction relative to the ejection board 108-2 so as to partially overlap the ejection board 108-2 in the X direction. Then, the above-described arrangement is repeated for the ejection board 108-4 and later. That is, the ejection boards 108 are arranged in a staggered manner and arranged so as to extend in the X direction as a whole.

On each ejection board 108, the eight nozzle arrays a to h are formed with multiple nozzles arranged along the X direction. The interval between the nozzles in the X direction of each of the nozzle arrays a to h is 1200 dpi. Note that, in the present embodiment, each nozzle of the nozzle arrays a to d is arranged so as to be shifted by ¼ of 1200 dpi in the X direction. Further, each nozzle of the nozzle arrays e to h is also arranged so as to be shifted by ¼ of 1200 dpi in the X direction. Furthermore, the nozzle array a and the nozzle array e have nozzles arranged at the matching positions along the X axis, which extends in the X direction. Similarly, the nozzle array b and the nozzle array f, the nozzle array c and the nozzle array g, and the nozzle array d and the nozzle array h have nozzles arranged at the matching positions along the X axis, which extends in the X direction.

It is possible for the nozzle arrays arranged at the matching positions in the X direction to preform printing so that the ejected ink dots overlap at the same coordinates on the print medium M. Each ejection board 108 is arranged along the X direction, and each print head 102, in which the above-described ejection boards 108 are arranged, is arranged along the Y direction. Further, by ejecting ink from each print head 102 onto the corresponding area on the print medium M that is conveyed in the Y direction, an image is printed on the print medium M.

Note that the printing apparatus 100 is not limited to the full-line type inkjet printing apparatus and may also be what is termed as a serial-type inkjet printing apparatus that performs scanning with a print head or a scanner in the X direction for printing. Further, the printing apparatus 100 is not limited to a form in which ink, i.e., a printing agent is directly applied to the print medium M from the print head 102. That is, such a form in which an ink layer is firstly formed on an intermediate transfer body and then the ink layer is transferred to the print medium M is also possible. Although the ink ejected by the printing apparatus 100 is described as four different types of ink, there is not a limitation as such. That is, it is only necessary that at least two different colors of ink can be ejected, and it is also possible to be equipped with multiple print heads that eject ink of the same color.

As illustrated in FIG. 3, the PC 200 includes the CPU 302, the RAM 304, the HDD 306, the data transfer interface (I/F) 308, the keyboard/mouse I/F 310, and the display I/F 312. The CPU 302 executes various kinds of processing according to programs held in the RAM 304, the HDD 306, etc., which are storage parts. The RAM 304 is a volatile storage, which temporarily holds various programs and data. The HDD 306 is a non-volatile storage, which holds various programs and data.

The data transfer I/F 308 controls the transmission and reception of data to and from the printing apparatus 100. As the connection system for this data transmission and reception, USB, IEEE1394, LAN, or the like can be used. The keyboard/mouse I/F 310 is an I/F that controls an HID (Human Interface Device) such as a keyboard and a mouse, and thus an input can be performed by the user via the keyboard/mouse I/F 310. The display I/F 312 controls displaying on a display device (not illustrated in the drawings) of the PC 200.

Further, as illustrated in FIG. 3, the printing apparatus 100 includes the CPU 320, the RAM 322, the ROM 324, the data transfer I/F 326, the head controller 328, the image processing accelerator 330, and the scanner controller 332. The CPU 320 executes various kinds of processing according to the programs stored in the RAM 322 and the ROM 324. The RAM 322 is a volatile storage, which temporarily holds various programs and data. The ROM 324 is a non-volatile storage, which holds various programs and data.

The data transfer I/F 326 controls the transmission and reception of data to and from the PC 200. The head controller 328 supplies print data to each print head 102 and controls the ejection operation of each print head 102. The head controller 328 is configured to read a control parameter and print data from a predetermined address of the RAM 322, for example. Further, if the CPU 320 writes a control parameter and print data to the above-described predetermined address of the RAM 322, the head controller 328 ejects ink from each print head 102, based on the control parameter and the print data. As described above, in the present embodiment, the print head 102 and the head controller 328 function as a printing unit that preforms printing based on print data.

The scanner controller 332 controls each reading element in the scanner 106 and outputs the obtained RGB data to the CPU 320.

The image processing accelerator 330 is hardware capable of executing image processing at a higher speed than the CPU 320. The image processing accelerator 330 is configured to read a parameter and data required for image processing from a predetermined address of the RAM 322, for example. Further, if the CPU 320 writes the parameter and data to the above-described predetermined address of the RAM 322, the image processing accelerator 330 is activated and predetermined image processing is executed for the data. Note that the image processing accelerator 330 is not an indispensable configuration, and it is also possible that the CPU 320 executes such processing performed by the image processing accelerator 330 as described above, depending on the specification of the printing apparatus 100 and the like.

In the printing system 10 explained above, a printed image is printed on the print medium M by use of multiple types of ink. In this printing system 10, image processing is executed to generate print data for reducing color shifts in a multi-ordinal-color image with multiple types of ink, which are caused by a variation in ejection characteristics among the multiple nozzles.

Figure 4A:
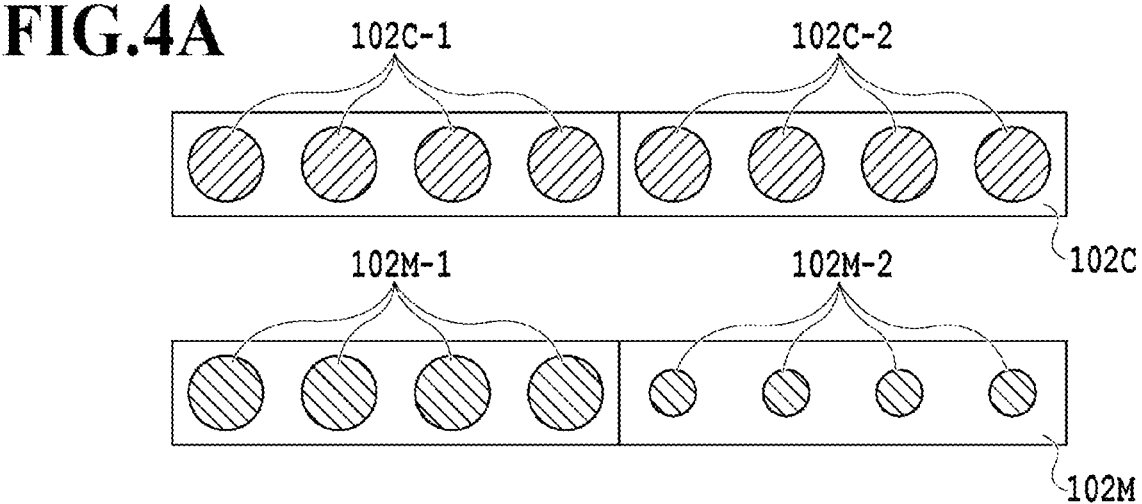
FIG. 4A to FIG. 4C are diagrams for explaining a color difference caused by a publicly-known technique.
Figure 4B:
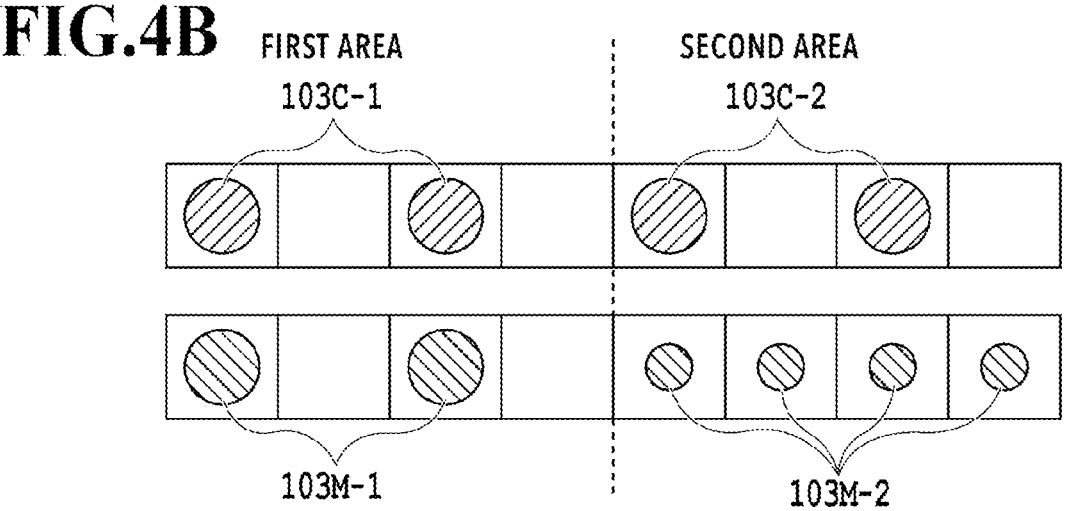
Figure 4C:
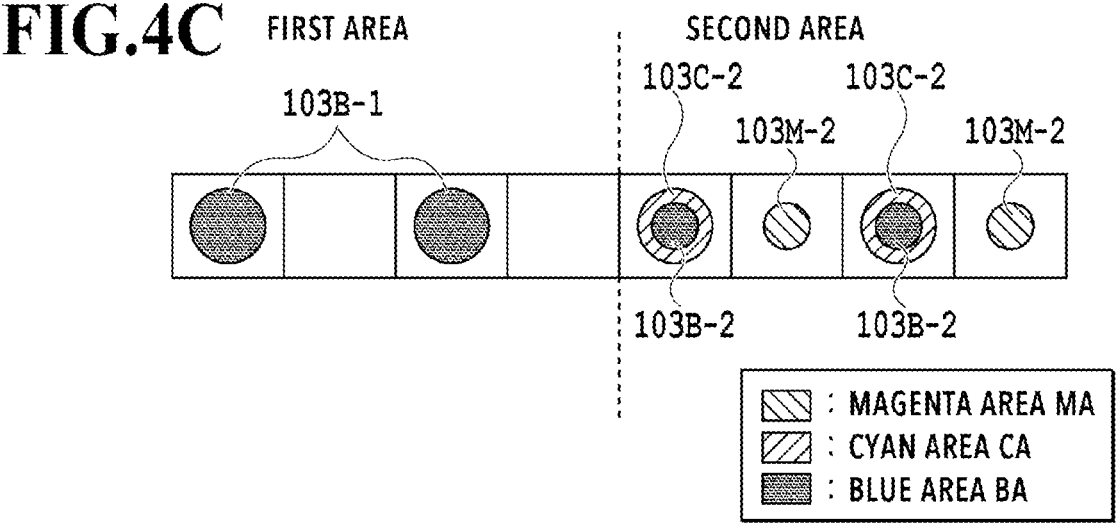

Here, firstly, with reference to FIG. 4A to FIG. 4C, a color shift (hereinafter also referred to as a "color difference") that occurs in a case where head shading (hereinafter referred to as "HS") processing of a publicly-known technique is performed will be explained. FIG. 4A to FIG. 4C are diagrams for explaining a color difference caused by a publicly-known technique. FIG. 4A is a diagram schematically illustrating nozzles in two print heads. FIG. 4B is a diagram illustrating the printing state of an image of 50% duty printed by use of the nozzles of FIG. 4A on the print medium M after correction by the HS processing of a publicly-known technique. Here, the "printing state of 50% duty" means that, as illustrated in the drawing, dots are applied to half of all the pixels. FIG. 4C is a diagram illustrating the printing state in which two kinds of ink are overlapped under the same condition as in FIG. 4B.

In the following explanation, a color difference that occurs in a case where an image of blue, which is a secondary color, is printed with cyan ink and magenta ink will be explained. In FIG. 4A, the print head 102C that ejects cyan ink and the print head 102M that ejects magenta ink are illustrated as the print head 102. Further, for ease of understanding, it is assumed that each print head is equipped with eight nozzles.

Further, in the following explanation, the print area of the print medium M is divided into two areas in the X direction, which is the array direction of the nozzles, so that the color difference that occurs between the images printed in these areas will be explained. Further, the area printed by use of the four nozzles on the left side of the nozzle arrays in the drawings is referred to as the first area, and the area printed by use of the four nozzles on the right side of the nozzle arrays in the drawings is referred to as the second area.

Note that, although the size of each nozzle and the size of a dot printed by the nozzle are illustrated in the same size in the explanation with reference to FIG. 4A to FIG. 4C, this is for clarifying the correspondence between both sizes for the sake of explanation, and the actual sizes of these are not the same. Further, the ejection amount from each nozzle differs also because of factors other than the size of the nozzle, i.e., the nozzle diameter, and therefore the nozzle diameters are not necessarily different. However, in this explanation, the nozzles with a larger ejection amount are illustrated with larger circles.

Of the eight nozzles of the print head 102C, each of the nozzles 102C-1 located on the left side in the drawing and the nozzles 102C-2 located on the right side in the drawing are capable of ejecting the standard amount of ink in the standard direction. Accordingly, on the print medium M, dots of the same size are printed at regular intervals with the ink ejected from the nozzles 102C-1 and 102C-2. On the other hand, of the eight nozzles of the print head 102M, the nozzles 102M-1 located on the left side in the drawing are capable of ejecting the standard amount of ink in the standard direction, and the nozzles 102M-2 located on the right side in the drawing are capable of ejecting ink of an ejection amount smaller than the standard amount in the standard direction.

In a case of using such a print head with a variation in ejection amounts such as the print head 102M, even if images of the same color are printed on the print medium M, the colors may differ depending on the area. Specifically, in the first area, which is the area printed by use of the four nozzles illustrated on the left side of the drawing, dots made of magenta ink having the same size as the dots made of cyan ink are formed. On the other hand, in the second area, which is the area printed by use of the four nozzles illustrated on the right side of the drawing, dots made of magenta ink smaller than dots made of cyan ink are formed at the same intervals as the dots made of cyan ink. Therefore, the colors are different in the first area and the second area.

Specifically, for example, the dots in a case of performing printing on the print medium M at the 50% duty after correction by a publicly-known HS processing are as illustrated in FIG. 4B. In FIG. 4B, 103C-1 is a cyan dot formed with the cyan ink ejected from a nozzle 102C-1, and 103C-2 is a cyan dot formed with the cyan ink ejected from a nozzle 102C-2. Further, 103M-1 is a magenta dot formed with the magenta ink ejected from a nozzle 102M-1, and 103M-2 is a magenta dot formed with the magenta ink ejected from a nozzle 102M-2. Note that the area of one magenta dot 103M-2 on the print medium M is ½ of the area of one magenta dot 103M-1 on the print medium M.

In this case, by the HS processing, the correction to make the image data corresponding to the nozzles 102M-2 to become darker in color, that is, the correction to increase the amount of ink ejected from the nozzles 102M-2, is performed. Specifically, by making the number of ejections from the nozzles 102M-2 into about twice the number of ejections from the nozzles 102M-1 (2 dots into 4 dots), it is possible to make the coverage areas of magenta ink almost the same in the first area and the second area. More specifically, binary dot data (binary data) of "1" representing printing and "0" representing non-printing is generated so that the number of dots formed by the nozzles 102M-2 is twice the original number of dots formed with the standard amount of ink.

As described above, in the HS processing with a publicly-known technique, the number of dots formed in each area is adjusted so that the color detected in each area on the print medium M becomes approximately uniform. Note that, although a coverage area and the detected color density are not necessarily in a proportional relationship in practice, an explanation will be given in the present embodiment with the example in which the number of dots of ½ of an area will be doubled.

With such HS processing of a publicly-known technique, a case in which the cyan dots 103C and the magenta dots 103M are formed in an overlapping manner will be as illustrated in FIG. 4C. Specifically, in the first area, the cyan dots 103C-1 and magenta dots 103M-1 in the standard size with the standard amount of ink are formed in an overlapping manner, so that the blue dots 103B-1 in the standard size are formed. On the other hand, in the second area, the blue dots 103B-2 are formed with the cyan dots 103C-2 in the standard size overlapping the magenta dots 103M-2 in ½ of the standard size. Further, in the second area, the magenta dots 103M-2 in ½ of the standard size are also formed. Note that, in the second area, the cyan areas CA with the cyan dots 103C-2 are formed around the blue areas BA with the blue dots 103B-2.

Therefore, in the second area, the sum of the areas of the magenta areas MA with the magenta dots 103M-2, the sum of the areas of the blue areas BA, and the sum of the areas of the cyan areas CA are approximately the same. Therefore, if the color observed with the sum of the light absorption characteristics of the magenta areas MA and the light absorption characteristics of the cyan areas CA matches the color observed with the light absorption characteristics of the blue areas BA, this second area is visually recognized as almost the same color as the blue areas BA. That is, the blue image of the first area and the blue image of the second area are visually recognized as the same color.

However, in a case where a multi-ordinal color is formed by overlapping multiple inks, the color observed with the light absorption characteristics of an area formed by overlapping multiple inks does not match the color observed with the sum of the light absorption characteristics of areas in which dots are formed with each of the multiple inks alone. Therefore, the first area matches the target standard color, but the second area does not match the standard color, and thus a color difference occurs. That is, in a case where the print medium M is divided into multiple unit areas along the X direction, the colors of the unit areas, e.g., the blue image of the first area and the blue image of the second area are perceived as different colors due to a variation in the ejection characteristics of the nozzles of the print head 102.

In this way, even in a case where HS processing by a publicly-known technique for correcting each ink color, a color difference occurs in unit areas of an image printed by use of two or more colors of ink, and thus deterioration occurs in the printed image. Therefore, in the present embodiment, such a difference in tints is suppressed as explained below. Note that such a variation in the ejection characteristics of the print head 102 can also occur in a multi-valued printing apparatus capable of changing the sizes of dots, such as a 4-valued printing apparatus that performs printing with dots of three stages, i.e., large, medium, and small dots. Therefore, the present embodiment is not limited to such a binary printing apparatus explained in the present specification and can also be applied to a multi-valued printing apparatus of three or more values.

Figure 5:
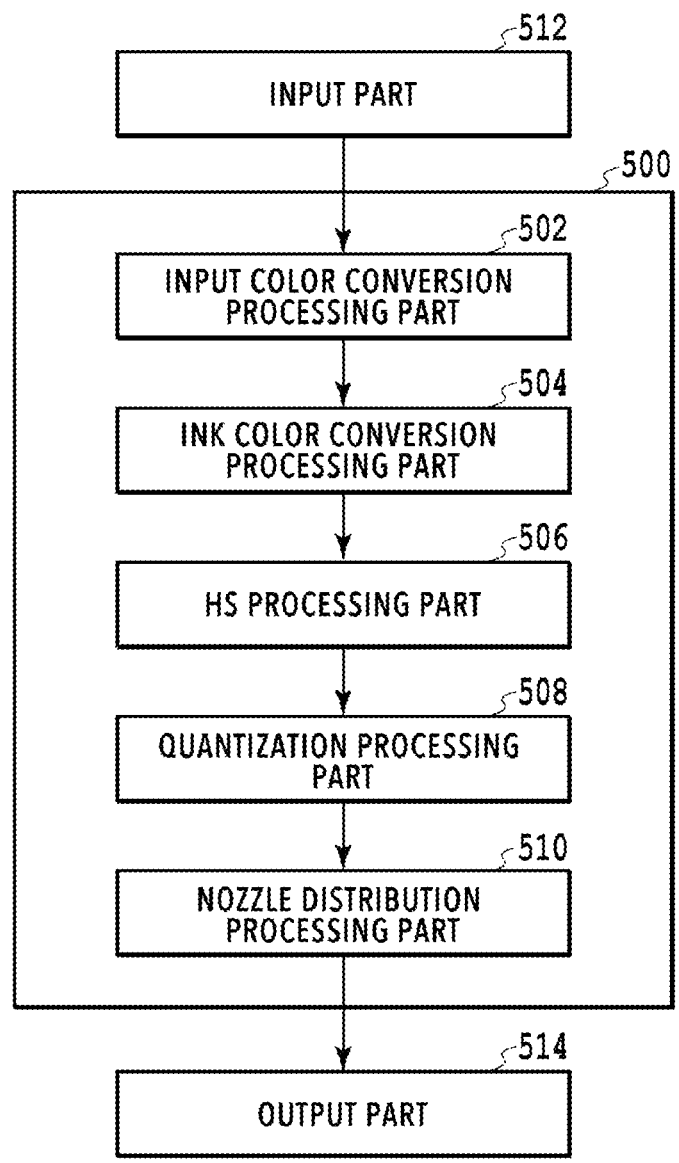
FIG. 5 is a block configuration diagram of the image processing apparatus of an embodiment.

Next, a technique for suppressing the above-described color difference in the printing system 10 will be explained. FIG. 5 is a block configuration diagram of the image processing apparatus for generating print data by performing image processing on image data in the printing system 10. In the printing system 10, the image processing apparatus 500 is formed, for example, with a configuration for executing various kinds of controls and processes in the printing apparatus 100. Note that the image processing apparatus 500 may be formed with a configuration for executing various kinds of controls and processes in the PC 200, and it is also possible that a part thereof is formed with a configuration included in the PC 200 and the other parts are formed with configurations included in the printing apparatus 100.

The image processing apparatus 500 of FIG. 5 includes the input color conversion processing part 502, the ink color conversion processing part 504, the HS processing part 506, the quantization processing part 508, and the nozzle distribution processing part 510. Note that each of these processing parts is implemented by, for example, the CPU 320, the image processing accelerator 330, etc.

The input color conversion processing part 502 converts the image data that is input from the PC 200 via the input part 512 into image data corresponding to the color gamut of the printing apparatus 100. The input part 512 is implemented by, for example, the data transfer I/F 308. The image data that is input from the input part 512 is data representing coordinates (R, G, B) in color space coordinates such as sRGB, which corresponds to the colors expressed by a monitor. The input color conversion processing part 502 converts input image data of 8-bit each R, G, and B into image data (R', G', B') in the color gamut of the printing apparatus 100 by a known method such as matrix calculation processing or processing using a three-dimensional look-up table (3DLUT). In the present embodiment, the conversion processing is performed by use of a 3DLUT in combination with complementary calculations. Note that the resolution of the 8-bit image data to be processed by the image processing apparatus 500 is 600 dpi, and the resolution of binary data (which will be described later) obtained by quantization performed by the quantization processing part 508 is 1200 dpi.

The ink color conversion processing part 504 converts image data of 8-bit each R, G, and B, which is converted by the input color conversion processing part 502, into image data formed with color signal data of the ink used in the printing apparatus 100. Since the printing apparatus 100 uses black (K), cyan (C), magenta (M), and yellow (Y) inks, the image data of the RGB signals is converted into image data formed with 8-bit each K, C, M, and Y color signals. As with the input color conversion processing part 502, this color conversion is also performed by use of a 3DLUT in combination with complementary calculations. Note that, as another conversion method, a method such as matrix calculation processing can be used.

The HS processing part 506 inputs image data of the color signals of the respective inks and performs HS processing on the 8-bit data for the respective ink colors according to the ejection amounts of the respective nozzles configuring the print head 102. Note that the specific details of this HS processing will be described later.

The quantization processing part 508 performs the quantization processing on the image data of the 8-bit each ink colors with 256 values, which is output from the HS processing part 506. In the quantization processing part 508, there is not a specific limitation on the form of the quantization. For example, such a form in which the 8-bit image data is directly converted into binary data of 1 bit representing "1" as printing or "0" as non-printing may be used, or such a form in which the 8-bit image data is once quantized into multi-valued data of 2 bits or more, i.e., 3 values or more, and then finally converted into binary data may be used. Note that, as the method for the quantization processing, an error diffusion method may be used, or another pseudo-halftone processing such as a dither method may be used.

The nozzle distribution processing part 510 distributes the binary data converted by the quantization processing part 508 to the nozzle groups of the associated print head 102. Note that the nozzle distribution processing part 510 may be omitted depending on the form of quantization. Based on the generated binary data (print data) for each print head 102 distributed by the nozzle distribution processing part 510 in this way, the output part 514 drives the print head 102 to eject ink of each color onto the print medium M for printing. The output part 514 is implemented by, for example, the head controller 328.

In the image processing apparatus 500 with the above configurations, image processing for generating print data which represents printing or non-printing of nozzles for each print head 102 from input image data is started at the timing where a job is input, for example. Thereafter, if an instruction for starting printing is provided, the print processing is performed based on the generated printed data.

Figure 6:
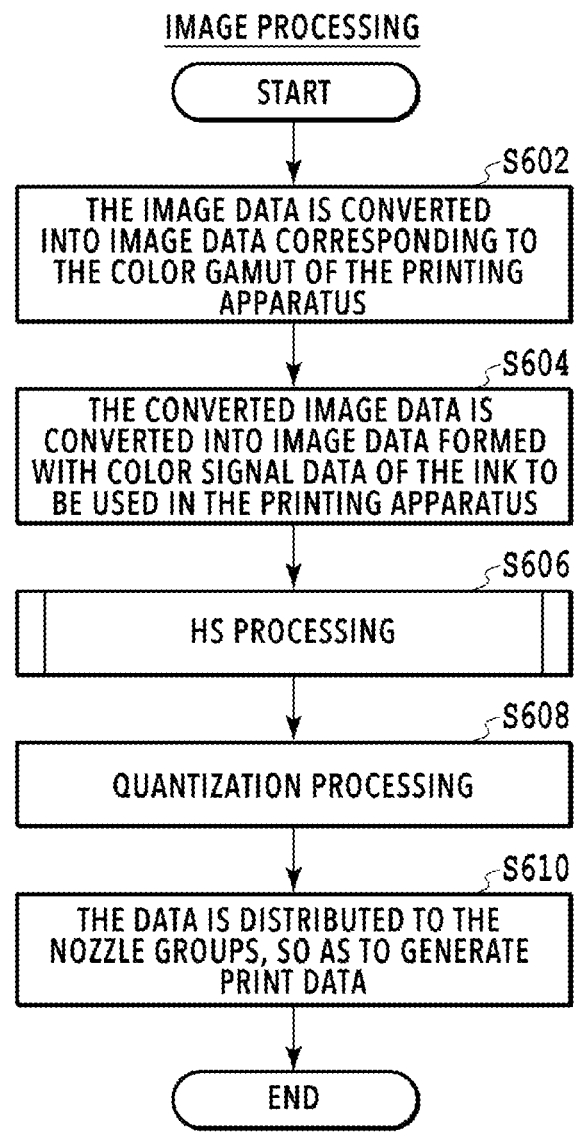
FIG. 6 is a flowchart of image processing executed by the image processing apparatus according to the first embodiment.

FIG. 6 is a flowchart illustrating the details of image processing. The series of these processes illustrated in the flowchart of FIG. 6 is performed by the CPU 320 (or the image processing accelerator 330) loading a program code stored in the ROM 324 into the RAM 322 and executing the program code. Alternatively, a part or all of the functions in the steps of FIG. 6 may be executed by hardware such as an ASIC or an electronic circuit. Further, the symbol "S" in the explanation of each process in the present specification means that it is a step in the flowcharts, which illustrate details of each processing.

If the image processing is started, firstly, the input color conversion processing part 502 converts the input image data into image data corresponding to the color gamut of the printing apparatus 100 (S602). Next, the ink color conversion processing part 504 converts the image data, which is converted by the input color conversion processing part 502, into image data formed with color signal data of the ink to be used in the printing apparatus 100 (S604). Then, the HS processing part 506 executes HS processing (which will be described later) on the converted image data (S606). Thereafter, the quantization processing part 508 performs quantization processing (which will be described later) on the image data after the HS processing, so as to generate binary data (S608), and the nozzle distribution processing part 510 generates print data by distributing the generated binary data to the nozzle groups of the print heads. Then, this image processing will be ended. Note that, in the following explanation, the image data converted in S604 is referred to as an "HS input image" as appropriate.

Figure 7:
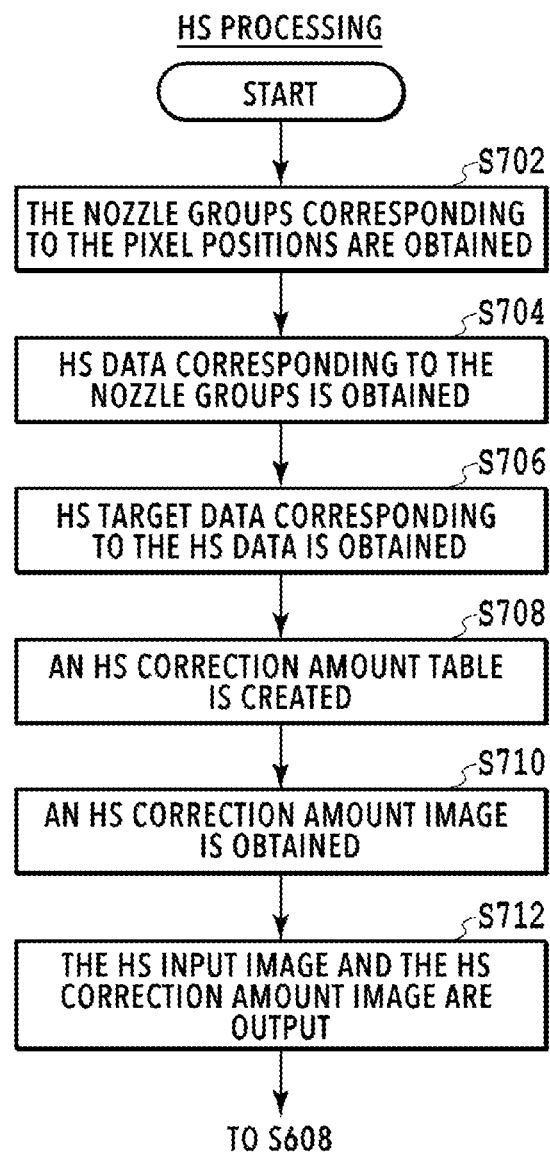
FIG. 7 is a flowchart of HS processing, which is a subroutine of the image processing.

Here, with reference to FIG. 7 to FIG. 8C, an explanation will be given of the HS processing, which is a subroutine of the image processing. FIG. 7 is a flowchart illustrating the details of processing of the HS processing. FIG. 8A to FIG. 8C are diagrams for explaining the HS processing to be executed for an input image. FIG. 8A is a diagram illustrating magenta data of 3×3 pixels at 600 dpi, which is input to the HS processing part 506. FIG. 8B is a diagram illustrating the intermediate data obtained by converting the HS input image of FIG. 8A by use of an HS target table. FIG. 8C is a diagram illustrating an example of an HS correction amount image.

Note that the HS processing is executed in the same manner for the print heads of the respective ink colors. In the explanation of the specific details of this HS processing, it is assumed that the magenta data illustrated in FIG. 8A is input to the HS processing part 506. That is, the image illustrated in FIG. 8A is an HS input image (first image), and every pixel of this HS input image has a signal value of "140". Further, as will be explained below, in the HS processing part of the present embodiment, the input image itself is not corrected, but an image for correction is output in addition to the input image.

If the HS processing is started, the HS processing part 506 firstly obtains the nozzle groups corresponding to the pixel positions of the HS input image (S702). Regarding the print head 102, as illustrated in FIG. 2, multiple nozzles are arranged in the X direction at intervals of 1200 dpi in each of the nozzle arrays a to h. Therefore, in the HS input image, the pixels on the left side of FIG. 8A correspond to the nozzle group 1 of the ejection board 108, the pixels in the middle of FIG. 8A correspond to the nozzle group 2 of the ejection board 108, and the pixels on the right side of FIG. 8A correspond to the nozzle group 3 of the ejection board 108.

Next, the HS processing part 506 obtains four sets of HS data corresponding to the nozzle groups of CMYK nozzle arrays, respectively (S704). Here, the HS data stores information related to the ejection characteristics of nozzles. The stored information may be, for example, the ejection amount of each nozzle or the information obtained by quantizing the ejection amount of each nozzle to a predetermined level number. Alternatively, a ratio to the average ejection amount of each nozzle or a value indicating a color to be printed on a predetermined printing sheet by each nozzle is also possible. As for the HS data, one that is obtained in advance by measurement or the like is stored in RAM 322, ROM 324, or the like. As described above, in the present embodiment, the HS processing part 506 functions as an obtaining unit that obtains an ejection performance.

Figure 9A:
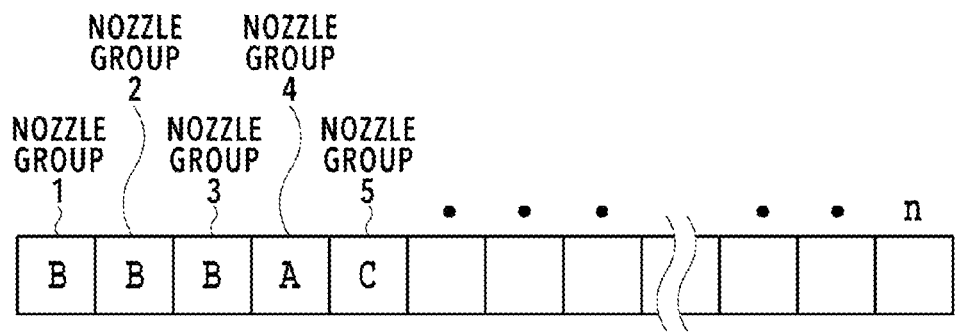
FIG. 9A to FIG. 9C are diagrams illustrating data used and data to be created in the HS processing.

FIG. 9A is a diagram illustrating an example of HS data. Ejection characteristics are respectively stored for the n sets of nozzle groups of 600 dpi each. The ejection characteristics A, B, and C stored herein each indicate an ink ejection amount, and thus the ejection characteristics A, B, and C indicate a variation in the ejection amounts of the nozzle groups. The ejection characteristic A is indicative of the largest ejection amount, the ejection amount B is indicative of the standard ejection amount, and the ejection amount C is indicative of the smallest ejection amount. Note that, although the ejection amount is divided into three stages as the ejection characteristics in the explanation here, there is not a limitation as such, and it is also possible that the ejection amount is divided into four or more stages as the ejection characteristics.

Figure 9B:
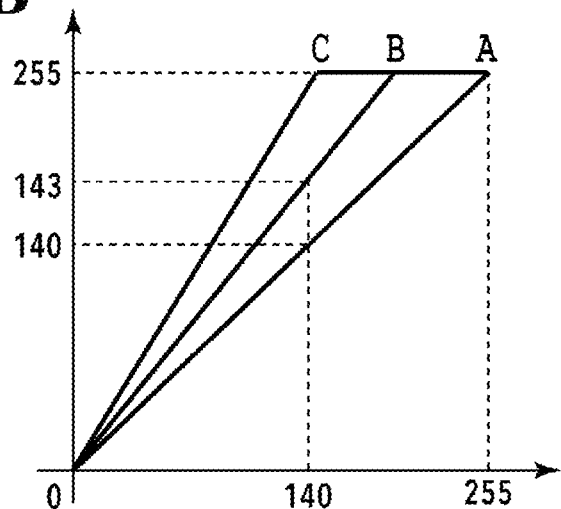

Thereafter, the HS processing part 506 obtains the HS target table corresponding to the HS data of the respective nozzles (S706). This HS target table is a one-dimensional conversion table indicating output values corresponding to input values. FIG. 9B is a diagram illustrating an example of the HS target table. In this target table, the input values are illustrated on the horizontal axis, and the output values are illustrated on the vertical axis. In the HS data of FIG. 9A, the ejection characteristic B which is indicative of the standard ejection amount is stored for the nozzle groups 1, 2, and 3. Therefore, in S706, the HS target table B of FIG. 9B is obtained in association with the nozzle groups 1, 2, and 3. Similarly, although not illustrated in FIG. 2, the HS target table A is obtained in association with the nozzle group 4, and the HS target table C is obtained in association with the nozzle group 5.

As described above, in S706, the HS target tables are associated with all of the n sets of nozzle groups for reference. The HS target tables of the present embodiment are created so that, for matching the nozzle groups of the maximum ejection amount among the variation in the ejection amounts of the print head 102, the signal values of the other nozzle numbers are converted into larger values. Therefore, the HS target table A of FIG. 9B is a conversion table in which the input signal values and the output signal values match, so that input signal values are not converted. For the ejection characteristic B, which has a smaller ejection amount than the ejection characteristic A, an output value larger than the ejection characteristic A is set for the same input signal value so that the ejection amount is supplemented.

Then, the HS processing part 506 creates an HS correction amount table from the HS target table obtained in S706 (S708). In S708, firstly, an output value is obtained based on the signal value of each pixel of the obtained HS target table and the HS input image. Specifically, in the HS target table B, the input signal value (input value) "140" corresponds to the output signal value (output value) "143". Therefore, the data representing the pixel values converted by use of the HS target table B is as illustrated in FIG. 8B. Note that, since the data in FIG. 8B is intermediate data illustrated in the drawing for ease of understanding, it is not essential to generate such intermediate data in actual processing.

Figure 9C:
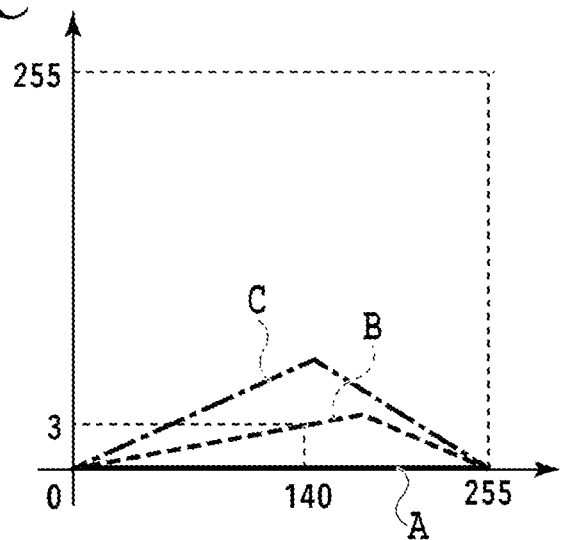

Thereafter, in S708, the difference obtained by subtracting an input value from an output value is calculated with the HS target table of FIG. 9B, so as to create such an HS correction amount table as in FIG. 9C. FIG. 9C is a diagram illustrating an example of the HS correction amount table. That is, the HS correction amount table is indicative of the correction amount representing how much a pixel signal value (pixel value) of a nozzle of a small ejection amount is to be increased. For example, in the present embodiment, the HS correction amount table A created from the HS target table A, which is selected for the nozzle groups of the ejection characteristic A having the largest ejection amount among the variation in the ejection amounts of the print head 102, is a table of which the correction amount is "0" regardless of the signal value, as illustrated with the solid line in FIG. 9C. The HS correction amount table B created from the HS target table B, which is selected for the nozzle groups of the ejection characteristic B of which the ejection amount is smaller than that of the ejection characteristic A, has values larger than that of the HS correction amount table A, as illustrated with the dotted line in FIG. 9C. In the present example, in a case where the input value is "140", the output value is "3". Note that the HS correction amount table C created from the HS target table C, which is selected for the nozzle groups of the ejection characteristic C of which the ejection amount is smaller than that of the ejection characteristic B, has values larger than that of the HS correction amount table B, as illustrated with the dashed-dotted line in FIG. 9C.

Next, the HS processing part 506 converts the pixel values of the HS input image by use of the HS correction amount table, in order to obtain an HS correction amount image which is indicative of the correction amount of each pixel (S710). That is, based on the HS correction amount table B, the pixel values of the HS input image corresponding to the nozzle groups 1, 2, and 3 are converted, in order to obtain the HS correction amount image illustrated in FIG. 8C. Each pixel of this HS correction amount image (second image) is assigned with a correction amount for the pixel value of the corresponding pixel in the HS input image. In the HS correction amount table B of FIG. 9C, in a case where the input value is "140", the output value is "3". Therefore, in the HS correction amount image of FIG. 8C, each pixel value is "3".

Thereafter, the HS processing part 506 outputs the HS correction amount image (see FIG. 8C) and the HS input image (see FIG. 8A) to the quantization processing part 508 (S712), and the processing proceeds to S608. As described above, in the present embodiment, the HS processing part 506 does not output corrected image data obtained by correcting input image data but, instead, outputs two image data, i.e., an HS input image and an HS correction amount image which represents a correction amount for each pixel.

Note that, although any of the tables A, B, and C is selected for the HS target table and the HS correction amount table in the HS processing, depending on the relative magnitude of the ejection amounts, there is not a limitation as such. That is, it is also possible to select a table which is associated according to the actual amount of ejection. Further, it is also possible that an HS input image is not output from the HS processing part 506 but output to the quantization processing part 508 not via the HS processing part 506. Moreover, it is also possible that the HS correction amount table created in S708 is created and stored in advance. As described above, in the present embodiment, the HS processing part 506 functions as a correction part that corrects a pixel value of an HS input image.

Figure 10:
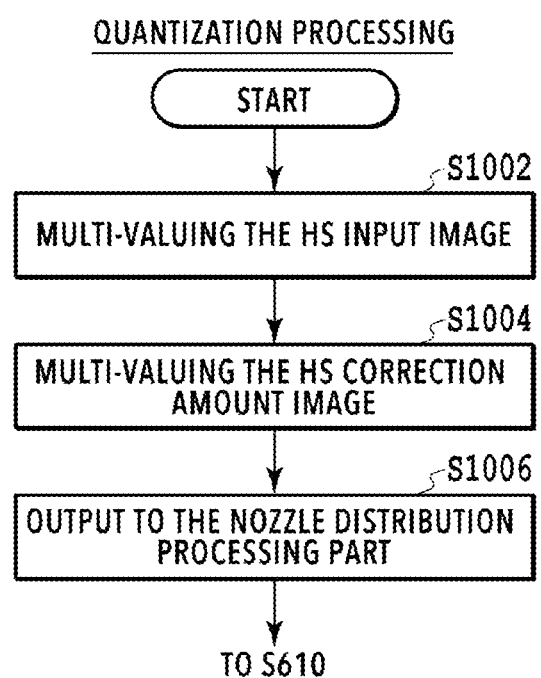
FIG. 10 is a flowchart of quantization processing, which is a subroutine of the image processing.

Next, with reference to FIG. 10 to FIG. 11F, an explanation will be given of the quantization processing, which is a subroutine of the image processing. FIG. 10 is a flowchart illustrating the details of the quantization processing. FIG. 11A to FIG. 11F are diagrams for explaining quantization of an HS input image and an HS correction image. FIG. 11A to FIG. 11C are diagrams for explaining an HS input image, and FIG. 11D to FIG. 11F are diagrams for explaining an HS correction image. FIG. 11A is a diagram illustrating a dither pattern in which a dither threshold value to be compared with the pixel value of each pixel in an HS input image is set. FIG. 11B is a diagram of multi-valued data illustrating the quantization level of each pixel, which is determined based on an HS input image. FIG. 11C is a diagram illustrating a dot image drawn with the number of dots to be ejected corresponding to the quantization levels of FIG. 11B. FIG. 11D is a diagram illustrating a dither pattern in which a dither threshold value to be compared with the pixel value of each pixel in an HS correction amount image is set. FIG. 11E is a diagram of multi-valued data illustrating the quantization level of each pixel, which is determined based on an HS correction amount image. FIG. 11F is a diagram illustrating a dot image drawn with the number of dots to be ejected corresponding to the quantization levels of FIG. 11E. Note that it is assumed that "multi-valued" in the present specification includes "binary".

In the quantization processing, firstly, the quantization processing part 508 makes the input HS input image multi-valued at 600 dpi (S1002). In S1002, for example, the number of dots is quantized to two values (quantization level: Lv0, Lv1) corresponding to 0 ejections or 1 ejection. Specifically, a pixel value of the HS input image of FIG. 8A is compared with the dither threshold value of each pixel of FIG. 11A, and the quantization level is set to Lv1 for the pixel whose pixel value is equal to or greater than the dither threshold value of the corresponding pixel. Further, for the pixel whose pixel value is less than the dither threshold value, the quantization level is set to Lv0. For example, since the pixel value of the upper left pixel of the HS input image is "140" and the dither threshold value corresponding to the pixel is "1", the quantization level of the pixel becomes Lv1. The quantization levels of the respective pixels obtained in this way are as illustrated in FIG. 11B, and, on the dot image drawn with the number of dots to be ejected corresponding to the quantization levels, one dot is placed on each pixel of Lv1 as illustrated in FIG. 11C.

Next, the quantization processing part 508 makes the input HS correction amount image multi-valued at 600 dpi (S1004). In S1004, as with S1002, each pixel value of the HS correction image of FIG. 8C is compared with the dither threshold value of each pixel of FIG. 11D. Then, the quantization level is set to Lv1 for the pixels whose pixel value is equal to or greater than the dither threshold value, and the quantization level is set to Lv0 for the pixels whose pixel value is less than the dither threshold value. For example, since the pixel value of the upper left pixel of the HS correction amount image is "3" and the dither threshold corresponding to the pixel value is "1", the quantization level of the pixel becomes Lv1. The quantization levels of the respective pixels obtained in this way are as illustrated in FIG. 11E, and, on the dot image drawn with the number of dots to be ejected corresponding to the quantization levels, one dot is placed only on the upper left pixel of Lv1 as illustrated in FIG. 11F.

Note that the process of S1004 may be executed prior to the process of S1002, or it is also possible that the process of S1002 and the process of S1004 are executed in parallel. Here, the same dither threshold values are used in both of the process of S1002, in which the quantization level of each pixel of an HS input image is determined, and the process of S1004, in which the quantization level of each pixel of an HS correction amount image is determined. Accordingly, the dot in FIG. 11F is quantized into the pixel on which a dot is placed in FIG. 11C. That is, the pixels in which a dot is ejected overlap between the quantization result of the HS correction amount image and the quantization result of the HS input image.

Thereafter, the quantization processing part 508 outputs the binary data (first multi-valued data) of the HS input image and the binary data (second multi-valued data) of the HS correction amount image to the nozzle distribution processing part 510 (S1006), and the processing proceeds to S610.

In S610, if two binary data are input, the nozzle distribution processing part 510 distributes the data to the nozzle groups associated in the process of S602 of the HS processing, so as to generate print data. Accordingly, two dots based on the binary data of the HS input image and the binary data of the HS correction amount image are placed on the upper left pixel. Further, one dot based on the binary data of the HS input image is placed on the lower left, upper right, and lower right pixels, and no dot is placed in the other pixels. As described above, in the present embodiment, the quantization processing part 508 (and the nozzle distribution processing part 510) functions as a generating unit that quantizes an HS input image and generates print data.

In the distribution of data, in a case where the pixels of the quantization level Lv1 of an HS input image and the quantization level Lv1 of an HS correction amount image are present at the same position, distribution to nozzle arrays that match each other in the X direction, such as the nozzle array a and the nozzle array e, is performed, for example. Alternatively, if the dots partially overlap, it is also possible that distribution to nozzle arrays that are shifted in the X direction, such as the nozzle array a and the nozzle array b, is performed. Alternatively, it is also possible that distribution to a nozzle that is adjoining the nozzle array a is performed, so that printing is performed at the position shifted by 1200 dpi in the X direction. Note that, although distribution to any nozzle of any nozzle array is possible within the same nozzle group in the distribution of data performed by the nozzle distribution processing part 510, the multiple dots to be printed have to at least partially overlap each other in consideration of the diameters of the dots.

In the present embodiment, an HS correction amount image representing the correction amount of each pixel is obtained in the HS processing, and binary data of an HS input image and the HS correction amount image are obtained in the quantization processing. Further, based on the obtained two binary data, the data is distributed to nozzle groups of the print head 102 so that the dots to be formed in the same pixel will at least partially overlap.

Figure 12A:
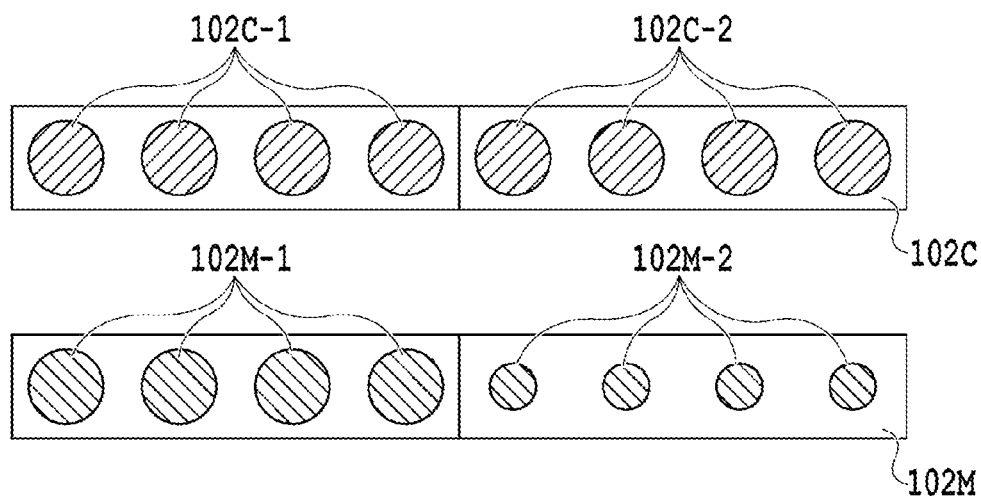
FIG. 12A and FIG. 12B are diagrams for explaining a printing state of printing based on generated print data.
Figure 12B:
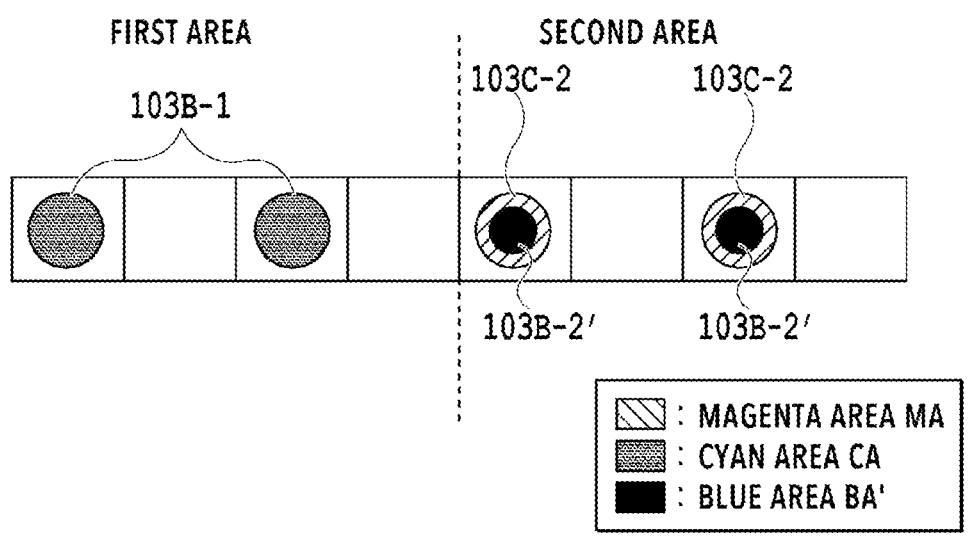

Here, with reference to FIG. 12A, FIG. 12B, and FIG. 4C, the functional effect of the processing in the image processing apparatus of the printing system 10 according to the present embodiment will be explained. FIG. 12A is a diagram schematically illustrating nozzles in two print heads. Further, FIG. 12B is a diagram illustrating the printing state of an image of 50% duty printed by use of the print heads of FIG. 12A on the print medium M, based on print data generated in the above-described image processing. Note that the nozzles illustrated in FIG. 12A are the same as the nozzles illustrated in FIG. 4A.

Comparing the printing state illustrated in FIG. 12B with the printing state illustrated in FIG. 4C where the publicly-known technique is used, the magenta dots 103M-2 with a small ejection amount, which are independently positioned in FIG. 4C, overlap with the cyan dots 103C-2 as well in FIG. 12B. That is, in FIG. 12B, the magenta dots 103M-2 increased by the HS processing overlap the magenta dots 103M-2 (which have already overlapped the cyan dots 103C-2) formed regardless of the HS correction. Further, in FIG. 12B, a new area that is referred to as a blue dot 103B-2', i.e., blue area BA', in which three dots (cyan dot 103C-2 and two magenta dots 103M-2) overlap, is formed.

Accordingly, in FIG. 12B, the difference in dot arrangement in the first area and the second area, that is, the difference in the degree to which dots of different colors overlap each other, is smaller than the difference in the dot arrangement by the publicly-known technique illustrated in FIG. 4C. Therefore, the difference in light absorption characteristics in the first area and the second area becomes smaller in the printing state of FIG. 12B, as compared to the printing state of FIG. 4C. Therefore, in FIG. 12B, the color difference of the first area and the second area becomes smaller even in macroscopic vision. That is, by the image processing, it is possible for the image processing apparatus according to the present embodiment to suppress the color difference of the first area and the second area, which is caused by the ejection characteristics of nozzles.

Second Embodiment

Next, with reference to FIG. 13 to FIG. 14F, an explanation will be given of the image processing apparatus according to the second embodiment. Note that, in the following explanation, the same or corresponding configurations as those of the first embodiment described above are assigned with the same signs as those used in the first embodiment, so as to omit the detailed explanations thereof.

The second embodiment is different from the above-described first embodiment in an aspect that the quantization processing is performed only on an HS input image, and a quantization level of multi-valued data of the HS input image obtained by the quantization is corrected based on an HS correction amount image.

Figure 13:
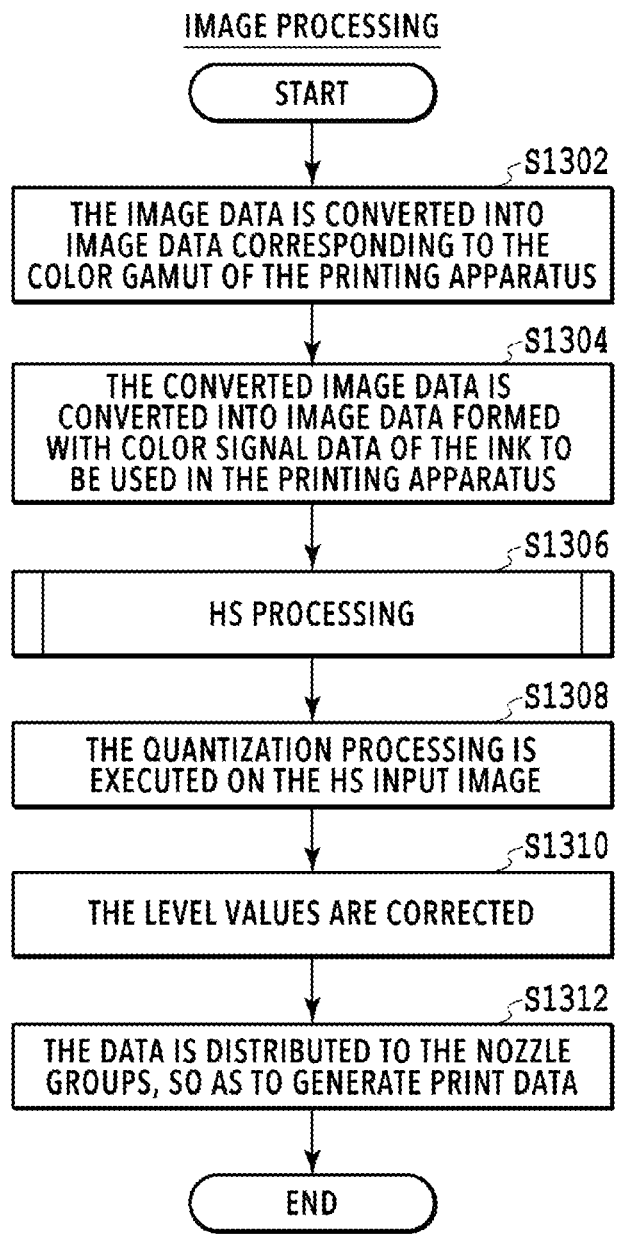
FIG. 13 is a flowchart of image processing executed by the image processing apparatus according to the second embodiment.
Figure 14:
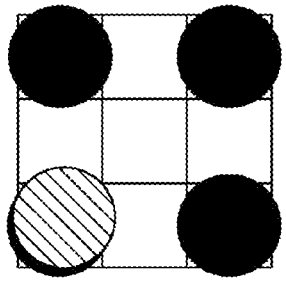
FIG. 14A to FIG. 14F are diagrams for explaining the quantization processing in the image processing.

FIG. 13 is a flowchart illustrating the details of the image processing executed by an image processing apparatus according to the second embodiment. If the image processing illustrated in FIG. 13 is started, the input color conversion processing part 502 converts the input image data into image data corresponding to the color gamut of the printing apparatus 100 (S1302). Next, the ink color conversion processing part 504 converts the image data, which is converted by the input color conversion processing part 502, into image data formed with color signal data of the ink to be used in the printing apparatus 100 (S1304). Then, the HS processing part 506 executes the HS processing (S1306). Note that, since the specific details of the HS processing of S1306 are the same as those of the HS processing of S606 described above, the detailed explanations thereof will be omitted.

Thereafter, the quantization processing part 508 executes the quantization processing (which will be described later) on the HS input image (S1308). Here, with reference to FIG. 14A to FIG. 14F, the quantization processing of S1308 will be explained. FIG. 14A is a diagram illustrating an HS input image. FIG. 14B is a diagram illustrating a dither pattern in which a dither threshold value to be compared with the pixel value of each pixel in the HS input image is set. FIG. 14C is a diagram of multi-valued data illustrating the quantization level of each pixel, which is determined based on the HS input image. FIG. 14D is a diagram of multi-valued data in which the level values of FIG. 14C are corrected. FIG. 14E is a diagram illustrating a dot image drawn with the number of dots to be ejected corresponding to the quantization levels of FIG. 14D. FIG. 14F is a diagram illustrating an HS correction amount image.

Note that, in the explanation of the quantization processing of S1308, an image of 3×3 pixels (see FIG. 14A) of which each pixel value is "47" is used as the HS input image. Further, as the HS correction amount image, an image of 3×3 pixels (see FIG. 14F) of which each pixel value is "1" is used.

In S1308, the HS input image is multi-valued at 600 dpi. Here, the number of dots is quantized to three values (quantization level: Lv0, Lv1, Lv2) corresponding to 0 ejections, 1 ejection, or 2 ejections. Note that, as the quantization method, various publicly-known quantization methods such as dither and error diffusion can be used. In the present embodiment, a case in which quantization is performed by use of a dither method will be explained.

In S1308, the dither threshold values illustrated in FIG. 14B are used. This dither threshold values are threshold values for determining the pixel values of 0 to 85, which are ⅓ of the pixel values of 0 to 255 configured of 8 bits, as either Lv0 or Lv1. Regarding each pixel value of the HS input image illustrated in FIG. 14A, a pixel equal to or greater than the dither threshold value which is set for the corresponding pixel is determined as the quantization level Lv1, and a pixel less than the dither threshold value is determined as the quantization level Lv0. For example, since the pixel value of the upper left pixel of the HS input image is "47" and the dither threshold corresponding to the pixel is "1", the quantization level of the pixel becomes Lv1. The quantization levels of the respective pixels obtained in this way are as illustrated in FIG. 14C.

If the quantization processing for the HS input image is completed, the quantization processing part 508 subsequently corrects the quantization levels of the multi-valued data obtained in S1306 according to each pixel value of the input HS correction amount image (S1310). In S1310, for example, the average value of the pixel values is calculated for each area of 3×3 pixels of the HS correction amount image, so that the number of dots to be ejected corresponding to the average value is obtained from a table (not illustrated in the drawings) created in advance. The average value of the pixel values of 3×3 pixels in the HS correction amount image illustrated in FIG. 14F is "1", and the number of dots to be ejected corresponding to this average value "1" is determined as one dot according to the above-described table. Further, a given one pixel of the Lv1 pixels in the multi-valued data illustrated in FIG. 14C (corresponding to the determined one dot described above) is selected, and the quantization level of the selected pixel is corrected from Lv1 to Lv2. That is, in S1310, the quantization levels of the number of given Lv1 pixels according to the average value are raised to the quantization level with which multiple dots are formed. Note that the number of dots to be ejected according to the average value of the pixel values of the HS correction amount image in the above-described table is experimentally calculated in advance, for example.

In this way, the quantization levels of the respective pixels after the level value correction are as illustrated in FIG. 14D. Then, the dot image drawn with the number of dots to be ejected corresponding to the quantization levels after this correction is as illustrated in FIG. 14E, in which one dot is placed on a pixel of Lv1 and two dots are placed on a pixel of Lv2. In FIG. 14E, the dots illustrated in black indicate the dots based on the HS input image, and the dot indicated with the diagonal lines indicates the dot increased by the correction based on the HS correction amount image. In this way, the quantization has been performed so that a dot based on the HS input image and a dot based on the HS correction amount image are formed in the same pixel.

Thereafter, the quantization processing part 508 outputs the multi-valued data obtained by correcting the quantization levels (see FIG. 14D) to the nozzle distribution processing part 510, and the nozzle distribution processing part 510 distributes the data to the nozzle groups associated in the HS processing (S1312). Note that, since the specific details of processing of S1312 are the same as those of S610 described above, the explanations thereof will be omitted.

In the present embodiment, the quantization levels in the multi-valued data of the HS input image are corrected based on the HS correction amount image obtained in the HS processing. Specifically, according to the average value of the pixel values in the HS correction amount image, the level values of the number of given pixels based on the above-described average value among the pixels whose quantization level is Lv1 in the multi-valued data of the HS input image are corrected so that the dots are increased. Then, the data is distributed to the nozzle groups of the print head 102, based on the corrected multi-valued data. Accordingly, in the image printed with the generated print data, the dot increased by the correction in the HS processing for each ink color at least partially overlaps a dot of the input image. Therefore, the same functional effect as that of the above-described first embodiment can be obtained.

Third Embodiment

Next, with reference to FIG. 15 to FIG. 16C, an explanation will be given of an image processing apparatus according to the third embodiment. Note that, in the following explanation, the same or corresponding configurations as those of the first embodiment described above are assigned with the same signs as those used in the first embodiment, so as to omit the detailed explanations thereof.

The third embodiment is different from the above-described first embodiment in an aspect that, as for multi-valued data of an HS correction amount image obtained by quantization, pixel data whose quantization level is Lv1 is moved to an adjoining pixel. Note that, in the present embodiment, only the quantization processing of the image processing illustrated in FIG. 6 is different from the above-described first embodiment. Therefore, in the following explanation, the quantization processing that is different from the above-described first embodiment will be explained in detail, and the other processing which is same as the above-described first embodiment will be omitted as appropriate.

Figure 15:
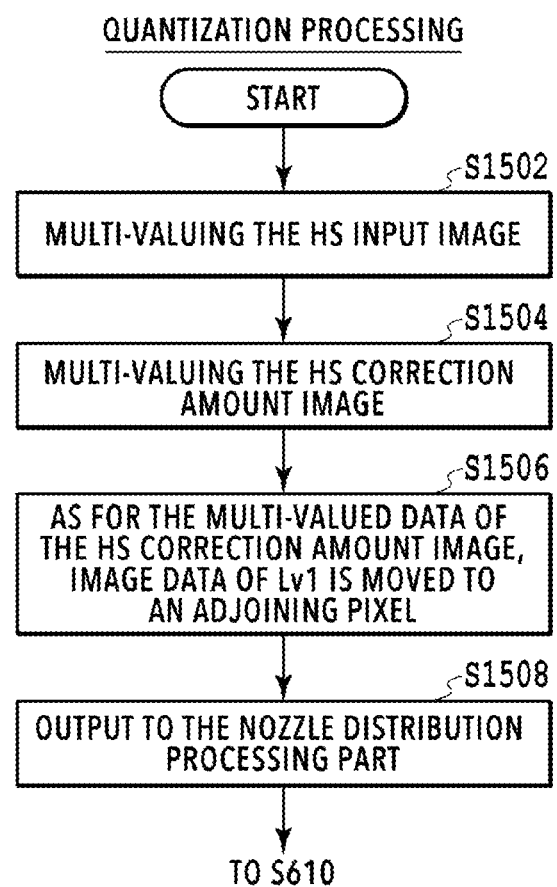
FIG. 15 is a flowchart of the quantization processing executed by the image processing apparatus of the third embodiment.

FIG. 15 is a flowchart illustrating details of the quantization processing, which is a subroutine of the image processing executed by an image processing apparatus of the third embodiment. Note that, in the following explanation, as in the above-described first embodiment, the HS input image illustrated in FIG. 8A and the HS correction amount image illustrated in FIG. 8C are obtained in the HS processing. If the quantization processing is started, firstly, the quantization processing part 508 makes the input HS input image multi-valued at 600 dpi (S1502) and makes the input HS correction amount image multi-valued at 600 dpi (S1504). Note that, since the specific details of processing of S1502 and S1504 are the same as those of S1002 and S1004 described above, the explanations thereof will be omitted. The binary data of the HS input image obtained in S1502 is as illustrated in FIG. 11B. Further, the binary data of the HS correction amount image obtained in S1504 is as illustrated in FIG. 11E.

Next, as for the binary data of the HS correction amount image, pixel data whose quantization level is Lv1 is moved to an adjoining pixel (S1506). Here, FIG. 16A to FIG. 16C are diagrams for explaining the movement of pixel data. FIG. 16A is a diagram of multi-valued data representing the quantization level of each pixel after moving the pixel data whose quantization level is Lv1 in the multi-valued data of the HS correction amount image. FIG. 16B is a dot image drawn with the number of dots corresponding to the quantization levels of FIG. 16A. FIG. 16C is a dot image in which the dot image of FIG. 16B and the dot image of FIG. 11C are combined.

In S1506, in the binary data of the HS correction amount image illustrated in FIG. 11E, the pixel data whose quantization level is Lv1, which represents printing with a dot, is moved to the adjoining pixel on the right side in the drawing (see FIG. 16A). Note that it is also possible that the adjoining pixel is the pixel on the left side in the drawing, the pixel on the upper side in the drawing, or the pixel on the lower side in the drawing. Note that, although only the pixel data whose quantization level is Lv1 is moved in S1506, there is not a limitation as such. That is, it is also possible that the entire binary data of the HS correction amount image is moved by one pixel in any one direction of up, down, left, and right. That is, any movement is possible as long as, in a case where a dot based on the binary data of the HS correction amount image is formed in the same pixel as a dot based on the binary data of the HS input image, these dots have been relatively moved so as to partially overlap each other.

The dot image drawn with the number of dots to be ejected corresponding to the quantization levels after the processing in S1506 is as illustrated in FIG. 16B. Further, if this dot image is combined with the dot image of the HS input image illustrated in FIG. 11C, the combined image is as illustrated in FIG. 16C. In this way, the multi-valued data of the HS correction amount image after the processing in S1506 is data in which the pixels where a dot is ejected are shifted by 600 dpi as compared to the multi-valued data of the HS input image. Here, if it is assumed that the diameter of a dot in the present embodiment is 50 micrometers, the interval between dots is 42 micrometers even in the data shifted by 600 dpi, and thus the dots based on the two multi-valued data partially overlap each other. Therefore, the ejected dots partially overlap in the quantization result of the HS correction amount image and the quantization result of the HS input image.

Thereafter, the quantization processing part 508 outputs the binary data of the HS input image and the binary data of the HS correction amount image, which is processed in S1506, to the nozzle distribution processing part 510 (S1508), and the processing proceeds to S610.

Although pixel data whose quantization level is Lv1 is moved to an adjoining pixel, that is, moved by one pixel in the present embodiment, there is not a limitation as such. That is, regarding the movement amount of the pixel data, any value may be used within a range in which a dot based on multi-valued data of an HS input image and a dot based on multi-valued data of an HS correction amount image partially overlap each other in accordance with the diameter of a dot, the resolution at the time of quantization, etc. Note that the movement of dots formed based on the HS correction amount image to adjoining pixels may be performed for each nozzle after the nozzle distribution processing.

In the HS correction amount image of the present embodiment, the pixel data whose quantization level is Lv1, with which a dot is formed, is shifted by a predetermined amount within a range of partially overlapping a dot based on the HS input image in accordance with the dot diameter, the resolution at the time of quantization. Specifically, pixel data whose quantization level is Lv1 in an HS correction amount image is moved to an adjoining pixel. Accordingly, in the image printed with the generated print data, a dot increased by the correction with the HS processing for each ink color at least partially overlaps a dot of the input image. Therefore, the same functional effect as that of the above-described first embodiment can be obtained.

Fourth Embodiment

Next, with reference to FIG. 17, an explanation will be given of an image processing apparatus according to the fourth embodiment. Note that, in the following explanation, the same or corresponding configurations as those of the first embodiment described above are assigned with the same signs as those used in the first embodiment, so as to omit the detailed explanations thereof.

The fourth embodiment is different from the above-described first embodiment in an aspect that a mask is applied to the multi-valued data of an HS input image obtained by quantization according to the pixel values of an HS correction amount image, and then the multi-valued data of the HS correction amount image is obtained.

Figure 17:
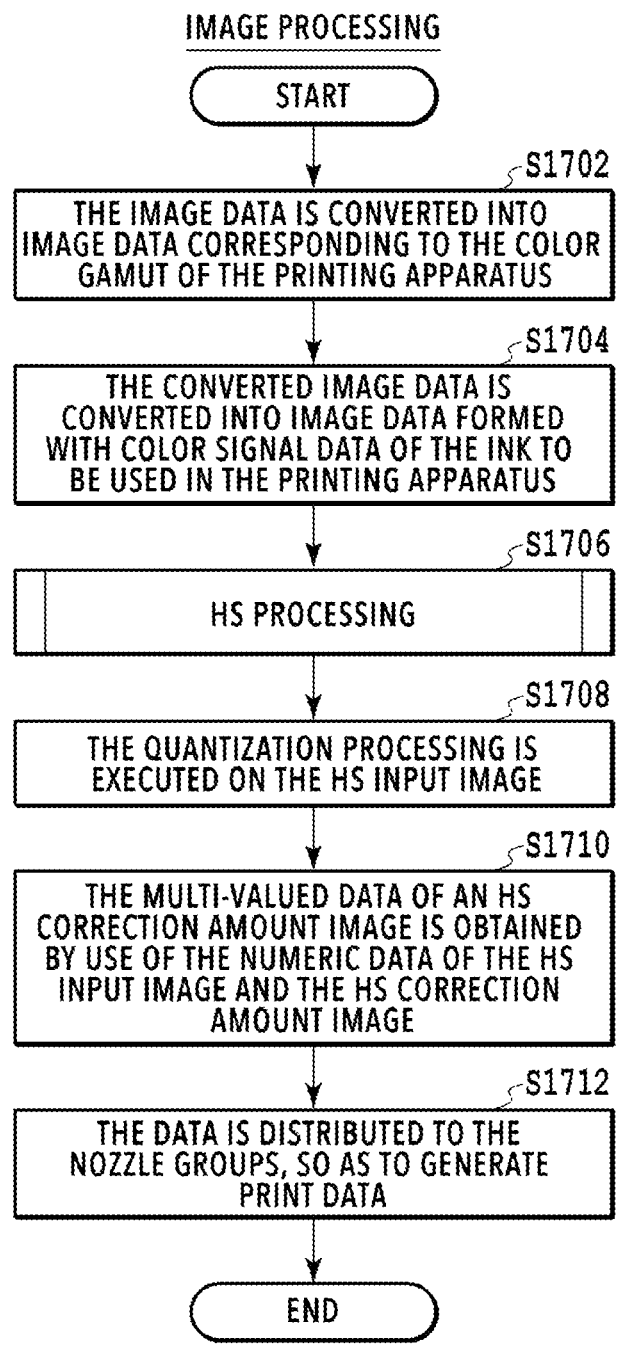
FIG. 17 is a flowchart of image processing executed by the image processing apparatus according to the fourth embodiment.

FIG. 17 is a flowchart illustrating details of the image processing executed by an image processing apparatus according to the fourth embodiment. If the image processing illustrated in FIG. 17 is started, the input color conversion processing part 502 converts the input image data into image data corresponding to the color gamut of the printing apparatus 100 (S1702). Next, the ink color conversion processing part 504 converts the image data, which is converted by the input color conversion processing part 502, into image data formed with color signal data of the ink to be used in the printing apparatus 100 (S1704).

Then, the HS processing part 506 executes the HS processing (S1706). Note that, since the specific details of the HS processing of S1706 are the same as those of the HS processing of S606 described above, the detailed explanations thereof will be omitted. Note that, in the following explanation, as in the above-described first embodiment, the HS input image illustrated in FIG. 8A and the HS correction amount image illustrated in FIG. 8C are obtained in the HS processing.

Next, the quantization processing part 508 executes the quantization processing on the HS input image (S1708). That is, in S1708, the HS input image is multi-valued at 600 dpi. Note that, since the specific details of processing of S1708 are the same as those of S1002 described above, the explanations thereof will be omitted. The binary data of the HS input image obtained in S1708 is as illustrated in FIG. 11B.

Thereafter, the quantization processing part 508 obtains the multi-valued data of an HS correction amount image from the binary data of the HS input image by use of a mask according to the pixel values of the HS correction amount image (S1710). In S1710, the average value of the pixel values is calculated for each area of 3×3 pixels of the HS correction amount image, so that the number of dots to be ejected corresponding to the average value is obtained from a table created in advance. Note that such a table is assumed to be the same as the table used in the second embodiment. Specifically, the average value of the pixel values of 3×3 pixels in the HS correction amount image illustrated in FIG. 8C is 3, and the number of dots to be ejected corresponding to the average value 3 is determined as one dot according to the above-described table. Then, a given one pixel (corresponding to the determined one dot described above) is selected from among the pixels whose quantization level is Lv1 in the binary data (see FIG. 11B) of the HS input image, and a mask is applied to the other pixels. Thereafter, for example, the binary data of the masked HS input image is duplicated, and the binary data of the HS correction amount image in which the quantization level Lv1 for printing a dot is arranged is obtained only from the selected pixel. That is, in the binary data of this HS correction amount image, the quantization level of the selected pixel is duplicated as Lv1, and the quantization levels of the other pixels are Lv0. Therefore, the obtained binary data of the HS correction amount image is as illustrated in FIG. 11E.

As described above, the binary data of the HS correction amount image is obtained by copying a part of the binary data of the HS input image. Therefore, in the binary data of the HS correction amount image, Lv1 is located at the pixel corresponding to the pixel of Lv1 which indicates printing of a dot in the binary data of the HS input image. Therefore, the pixels in which a dot is ejected overlap between the quantization result of the HS correction amount image (see FIG. 11F) and the quantization result of the HS input image (see FIG. 11C).

Then, the quantization processing part 508 outputs the binary data of the HS input image and the binary data of the HS correction amount image to the nozzle distribution processing part 510, and the nozzle distribution processing part 510 distributes the data to the nozzle groups associated in the HS processing (S1712). Note that, since the specific details of processing of S1712 are the same as those of S610 described above, the explanations thereof will be omitted.

Note that, in the quantization processing of S1708, it is also possible that the HS input image is multi-valued at 1200 dpi. Further, it is also possible that the multi-valued data of the HS correction amount image is obtained after the multi-valued data of the HS input image is output to the nozzle distribution processing part 510 and the data is distributed to the nozzle groups. Further, it is also possible that the multi-valued data of the HS correction amount image is obtained by moving pixel data whose quantization level is Lv1 to an adjoining pixel by use of the method of the above-described third embodiment.

In the present embodiment, a mask is applied to the pixels other than the pixel whose quantization level is Lv1 in the multi-valued data of the HS input image, so that the quantization level of the pixel is duplicated, and thus the binary data of the HS correction amount image is obtained. Note that, as for pixels whose quantization level is Lv1 in the multi-valued data of the HS input image, the number of given pixels based on the average value of the pixel values of the HS correction amount image are selected. Accordingly, in the image printed with the generated print data, a dot increased by the correction with the HS processing for each ink color overlaps a dot of the input image. Therefore, the same functional effect as that of the above-described first embodiment can be obtained.

Other Embodiments

Although not particularly described in the above-described embodiments, the methods according to the above-described embodiments are highly effective for data with which dots do not fill the entire print medium M, for example, data to be printed with a relatively low duty of 50% or less. Therefore, in the image processing apparatus 500, it is also possible that the image processing according to the above-described embodiments is applied only to an image printed at a duty of a predetermined value or less. Note that the predetermined value may be calculated experimentally, for example, depending on the performance of the printing apparatus to be used. Further, it is also possible that, in an image area using multiple ink colors, the image processing according to the above-described embodiments is applied only to an ink color at a duty of a predetermined value or less. Here, "duty" is the ratio of the number of pixels to which dots are given to all printable pixels. For example, in FIG. 11C, it can be said that the duty is about 44% since dots are given to 4 out of 9 pixels.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-131644, filed Aug. 3, 2020, which is hereby incorporated by reference wherein in its entirety.

What is claimed is:

1. An image processing apparatus comprising one or more processors serving as:
   a first obtaining unit configured to obtain ejection characteristics related to a plurality of printing elements for applying a printing agent on a print medium;
   a second obtaining unit configured to obtain first quantization data which is configured with a printing pixel, which represents that a printing agent is applied, or a non-printing pixel, which represents that a printing agent is not applied, based on first image data;
   a third obtaining unit configured to obtain, based on the first image data and the ejection characteristics, information on a pixel to which a printing agent is applied in an overlapping manner out of the printing pixels represented by the first quantization data; and
   a generating unit configured to generate, based on the first quantization data and the information on the pixel, print data which specifies application or not-application of a printing agent for each of a plurality of pixel areas arranged on the print medium with respect to the plurality of printing elements.

2. The image processing apparatus according to claim 1, wherein the information on the pixel is second quantization data corresponding to a correction value based on the ejection characteristics.

3. The image processing apparatus according to claim 2, wherein the second quantization data is obtained by quantizing correction image data, which represents the correction value of each pixel in the first image data.

4. The image processing apparatus according to claim 3, wherein the first quantization data and the second quantization data are obtained by a dither method, and
   wherein, in the dither method, threshold values for quantizing each pixel of the first image data and the correction image data are the same.

5. The image processing apparatus according to claim 2, wherein the first quantization data and the second quantization data are multi-valued data with three values or more.

6. The image processing apparatus according to claim 2, wherein the generating unit moves a pixel value indicating application of printing agent in the second quantization data.

7. The image processing apparatus according to claim 6, wherein the generating unit moves the pixel value to an adjoining pixel.

8. The image processing apparatus according to claim 1, wherein the information on the pixel is an average value of pixel values of correction image data in a predetermined area, which represents a correction value based on the ejection characteristics of each pixel in the first image data, and wherein the generating unit generates the print data by correcting the first quantization data, based on the average value.

9. The image processing apparatus according to claim 8, wherein, based on the average value, the generating unit changes a pixel value of a printing pixel in the first quantization data to a pixel value indicating application of a plurality of printing agents.

10. The image processing apparatus according to claim 2, wherein, as the second quantization data, the third obtaining unit obtains multi-valued data by duplicating a printing pixel in the first quantization data corresponding to an average value of a pixel value of correction image data in a predetermined area, which represents the correction value of each pixel in the first image data.

11. The image processing apparatus according to claim 1, wherein printing duty corresponding to pixel value of the first image data is a predetermined value or less.

12. The image processing apparatus according to claim 11, wherein the predetermined value is 50%.

13. The image processing apparatus according to claim 1, further comprising a printing unit configured to perform printing with a print head based on the print data, wherein the plurality of printing elements are included in the print head.

14. An image processing method comprising
a first obtaining step of obtaining ejection characteristics related to a plurality of printing elements for applying a printing agent to a print medium;
a second obtaining step of obtaining first quantization data which is configured with a printing pixel, which represents that a printing agent is applied, or a non-printing pixel, which represents that a printing agent is not applied, based on first image data;
a third obtaining step of obtaining, based on the first image data and the ejection characteristics, information on a pixel to which a printing agent is applied in an overlapping manner out of the printing pixels represented by the first quantization data; and
a generating step of generating, based on the first quantization data and the information on the pixel, print data which specifies application or non-application of a printing agent for each of a plurality of pixel areas arranged on a print medium with respect to the plurality of printing elements.

15. A non-transitory computer readable storage medium storing a program for causing a computer to function as an image processing apparatus, the program comprising code for causing one or more processors of the image processing apparatus to function as:
a first obtaining unit configured to obtain ejection characteristics related to a plurality of printing elements for applying a printing agent to a print medium;
a second obtaining unit configured to obtain first quantization data which is configured with a printing pixel, which represents that a printing agent is applied, or a non-printing pixel, which represents that a printing agent is not applied, based on first image data;
a third obtaining unit configured to obtain, based on the first image data and the ejection characteristics, information on a pixel to which a printing agent is applied in an overlapping manner out of the printing pixels represented by the first quantization data; and
a generating unit configured to generate, based on the first quantization data and the information on the pixel, print data which specifies application or non-application of a printing agent for each of a plurality of pixel areas arranged on a print medium with respect to the plurality of printing elements.

* * * * *